March 24, 1970  G. B. GRENZBERG ET AL  3,502,095
FLOW CONTROL DEVICE

Filed June 27, 1968  3 Sheets-Sheet 1

INVENTORS.
Gerhard B. Grenzberg
Ward C. Smith
BY
William D. Fosdick
AGENT

INVENTORS.
Gerhard B. Grenzberg
Ward C. Smith
BY
William D. Fosdick
AGENT

United States Patent Office 3,502,095
Patented Mar. 24, 1970

3,502,095
FLOW CONTROL DEVICE
Gerhard B. Grenzberg and Ward C. Smith, Medfield, Mass., assignors to Corning Glass Works, Corning, N.Y., a corporation of New York
Filed June 27, 1968, Ser. No. 740,682
Int. Cl. G01n *21/00;* A61m *1/00;* F16l *55/14*
U.S. Cl. 137—205    8 Claims

ABSTRACT OF THE DISCLOSURE

A device for controlling fluid flow into and out of a chamber, such as a sample testing chamber. The sample chamber is connected to a vacuum pump by means of a conduit, which, in turn, communicates with a flexible tube having a roller in a position to compress the tube. The roller is moved along the flexible tube in order to create a vacuum, which is communicated through the conduit to the sample chamber. A valve located on the conduit between the vacuum source and its connection with the flexible tube is normally closed, except when the roller is at its most advanced position, in which position the flexible tube, the free end of which is vented to atmosphere, is no longer compressed by the roller. In this position the valve opens, and all fluid is withdrawn by the vacuum pump to a waste container.

BACKGROUND OF THE INVENTION

In performing analyses on fluids, such as making pH measurements on small blood samples, it is customary to place the sample in the sample chamber by means of suction. In order for accurate measurements to be made, it is necessary that the filling process be carefully controlled in order to prevent the formation of bubbles, which impair the accuracy of the measurement. It has been the custom in the past to use vacuum pumps with simple on-off valves between the vacuum pumps and the sample chambers. Not only do such arrangements not provide precise control, but also, since flow can be effected in only one direction, when a bubble is formed in the sample, the entire sample must be discarded and a new sample obtained.

It is an object of the present invention to provide a device which is free from the above-mentioned disadvantages.

SUMMARY OF THE INVENTION

According to the invention, precise fluid control is obtained by the use of a device in which the sample chamber is connected to a vacuum source by means of a conduit having a valve therein. Between the valve and the sample chamber one end of a flexible tube communicates with the conduit. The other end of the flexible tube is open to atmosphere, and a roller is positioned to be moved along the flexible tube and to pinch it against a backing member. The conduit valve is normally closed, and as the roller is moved along the flexible tube in a direction toward its open end, a suction is created in the sample chamber, drawing the sample into the chamber. If it is desired to eject the sample for subsequent use, reverse movement of the roller will effect such ejection. When it is desired to discard the sample, the conduit valve is opened, and the sample is drawn by the vacuum source into a waste container. Preferably, the distance between the roller and the opposed surface of the backing member is increased in order to permit the vacuum source to withdraw from the flexible tube any fluid which may have accidentally been deposited there.

DESCRIPTION OF THE PREFERRED EMBODIMENT

Figure 1:
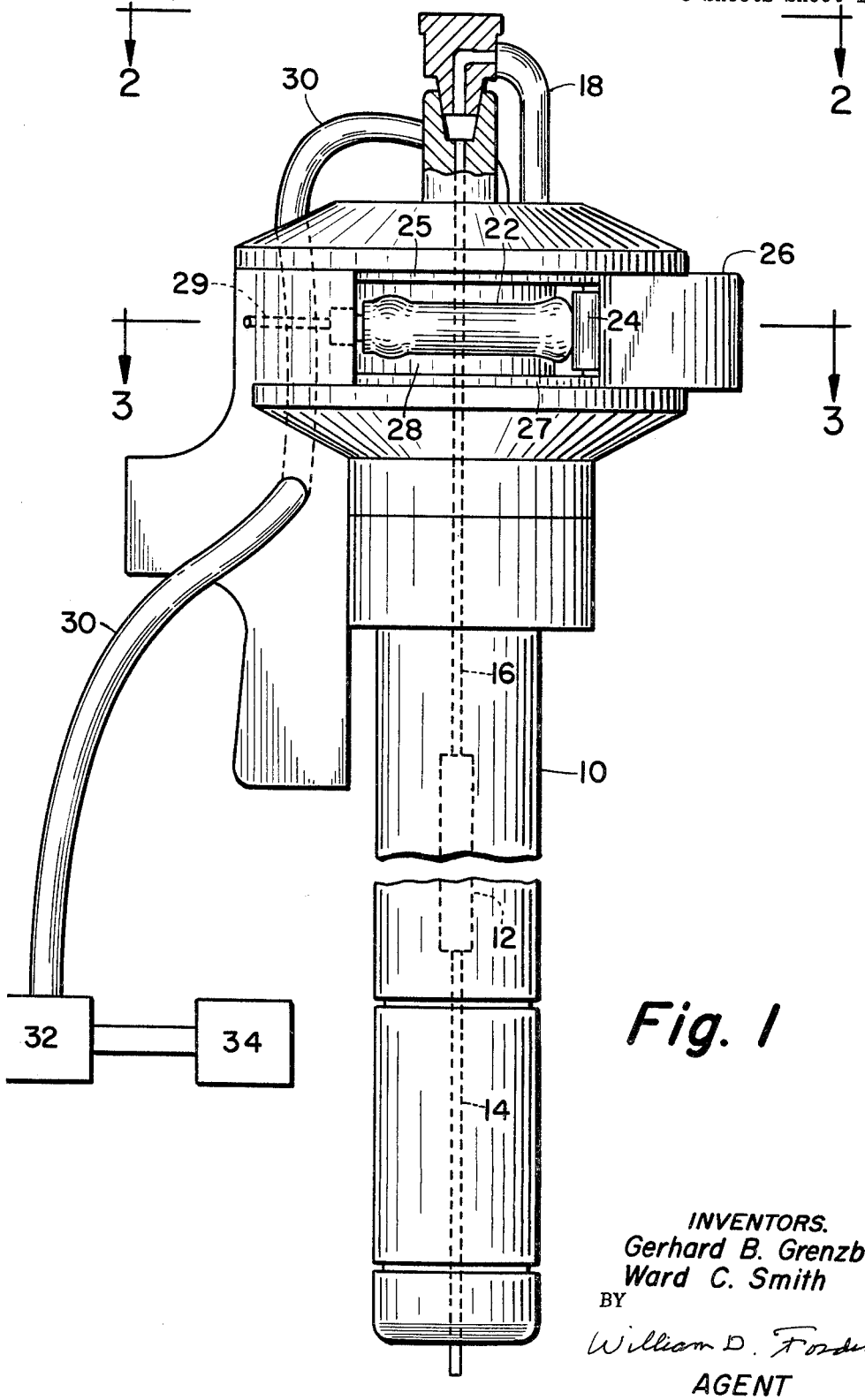
FIG. 1 is a side elevational view of a fluid control device according to the invention.
Figure 2:
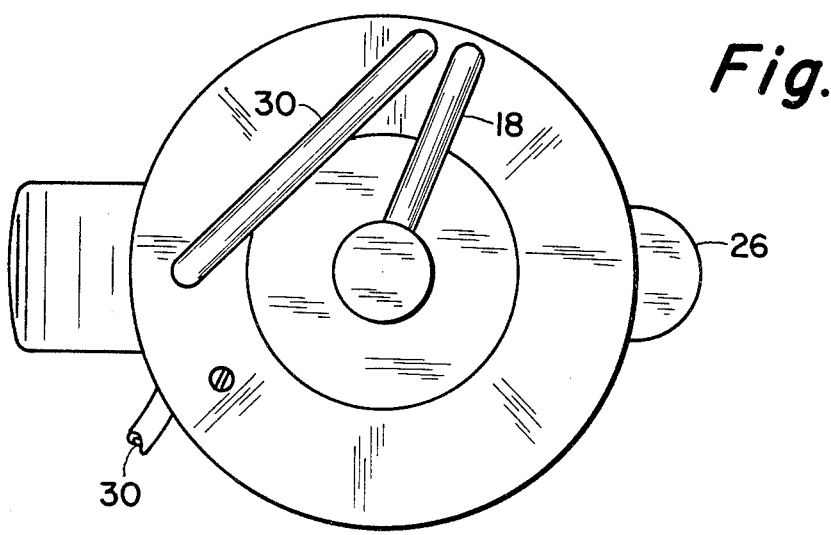
FIG. 2 is a top plan view of the device of FIG. 1 taken on line 2—2 of FIG. 1.
Figure 4:
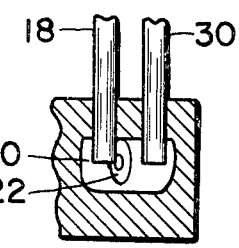
FIG. 4 is a sectional view taken on line 4—4 of FIG. 3.
Figure 3:
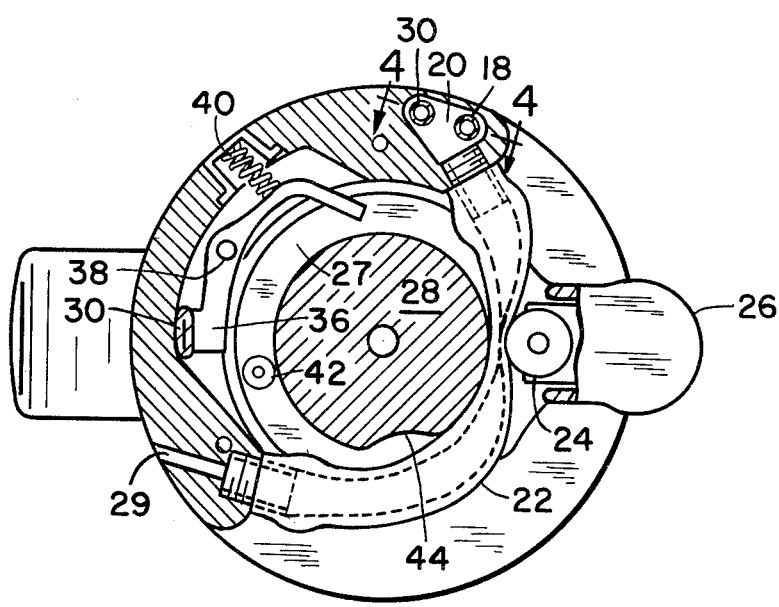
FIG. 3 is a sectional view taken on line 3—3 of FIG. 1.
Figure 5:
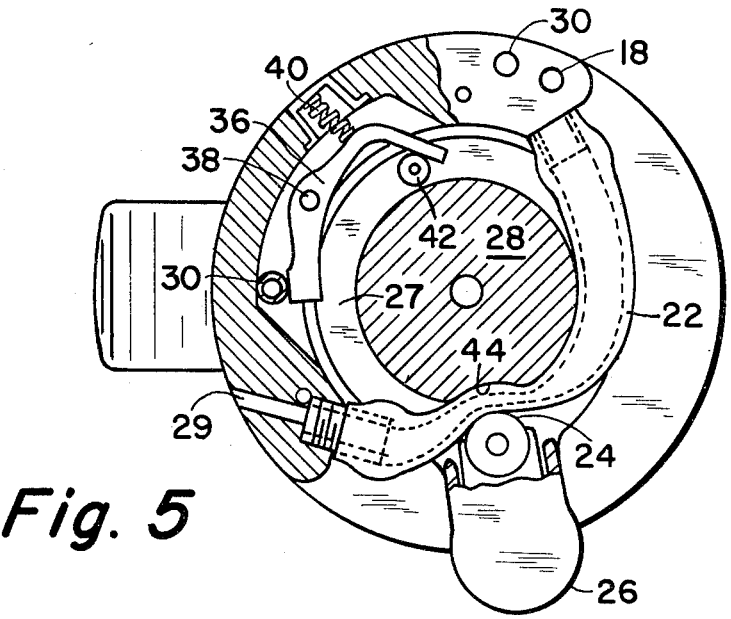
FIG. 5 is a sectional view similar to that of FIG. 3 illustrating the device in the sample discard position.
Figure 6:
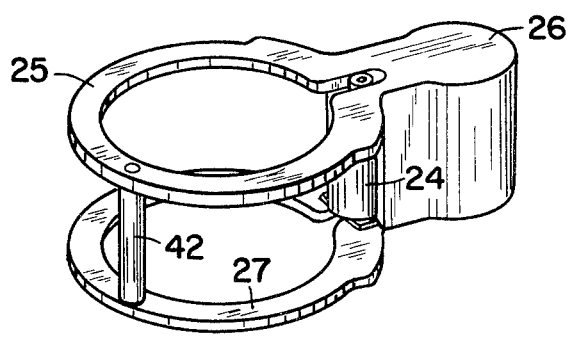
FIG. 6 is a view illustrating the supporting structure for the roller.

Referring to the drawing, the flow control device of the invention comprises a housing 10 having therein a sample chamber 12, illustrated in FIG. 1. Fluid enters the sample chamber through inlet 14 and travels from the chamber through outlet 16. Outlet 16, in turn, communicates with tube 18, which opens into cavity 20. Also communicating with cavity 20 is one end of flexible tube 22, as illustrated in FIGS. 3–5. Roller 24, which is fixed to and movable by handle 26, normally cooperates with shaft 28 to maintain the flexible tube pinched closed, the shaft acting as a backing member. Handle 26, which carries roller 24, is mounted on two identical rings 25 and 27. The rings have their inner surfaces in contact with shaft 28, such that the roller is guided in a circular path. Flexible tube 22 is vented to atmosphere at its remaining end through channel 29. Thus, when the roller is moved along the flexible tube in the direction of the vented end a vacuum is created behind the roller, the vacuum being transmitted through cavity 20, tube 18, outlet 16, sample chamber 12 and inlet 14 in order to draw fluid through the inlet into the sample chamber.

Figure 7:
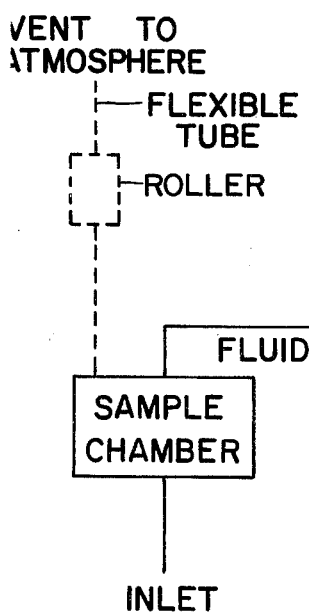
FIG. 7 is a schematic diagram illustrating the operation of the device of FIGS. 1–6.

In addition to tube 18 and flexible tube 22 there is in communication with cavity 20 a third tube 30 which, together with tube 18 and outlet 16 form the fluid conduit illustrated schematically in FIG. 7. Tube 30 communicates with waste container 32 in which a vacuum is maintained by means of vacuum pump 34. As illustrated in FIG. 3, during most of the path of roller 24, tube 30, which is flexible, is held closed by lever arm 36, which is pivoted about pin 38 by spring 40 and forms a valve for tube 30. Thus, normally the sample chamber is not exposed to the vacuum from vacuum pump 34, but is subjected only to the precisely controllable vacuum produced by the roller and flexible tube 22. However, when it is desired to discard the sample, roller 24 is moved to the position illustrated in FIG. 5. In this position, pin 42, mounted between rings 25 and 27, actuates lever arm 36, compressing spring 40 and rotating the arm away from tube 30. At the same time, roller 24 is positioned opposite groove 44 in shaft 28. Due to the increased distance between the roller and the shaft, flexible tube 22 partially opens due to its resilience. At this position the effect of the vacuum produced by vacuum pump 34 is transmitted through tube 30 to cavity 20, from which the effect is transmitted to flexible tube 22 and, at the same time, through tube 18 and outlet 16 to sample chamber 12. In this manner, any fluid in the device is removed to waste container 34. Subsequently, roller 24 can be moved back to the position illustrated in FIG. 3, and the device will be in position to receive another sample. If an unwanted bubble is formed in the sample, the movement of the roller may be reversed prior to the opening of tube 30, and the sample will be ejected back through inlet 14.

The means by which the sample is tested has not been described, inasmuch as the testing means forms no part of the present invention. The present device may be used to aspirate samples in various testing devices.

In an alternative embodiment, the flexible tube employed in the present device may be connected directly to the sample chamber in the manner indicated schematically by the broken lines in FIG. 7. Accordingly, in the appended claims when it is stated that the flexible tube is in communication with the sample chamber, it is intended to include both arrangements wherein the communication is indirectly through the fluid conduit, as in the illustrated preferred embodiment, and arrangements wherein the communication is directly with the sample chamber, as indicated schematically.

Inasmuch as the foregoing description has been provided solely as that of a preferred embodiment of the invention, it is intended that the scope of the present invention be limited only by the scope of the appended claims.

We claim:
1. Flow control means comprising
   a sample chamber having an inlet and an outlet,
   a vacuum source,
   first conduit means connecting said outlet of said sample chamber and said vacuum source,
   valve means for opening and closing said first conduit means,
   second conduit means in the form of a flexible tube having a first end in communication with said sample chamber,
   a backing member for said flexible tube,
   compressing means positioned against said flexible tube so as to compress and close said flexible tube against said backing member, and
   means for moving said compressing means along said flexible tube so as progressively to compress said flexible tube against said backing member,
   whereby movement of said compressing means away from said first end of said flexible tube causes a vacuum in said sample chamber to draw fluid into said sample chamber, and the opening of said valve means causes fluid to flow out of said sample chamber.

2. Flow control means according to claim 1 in which said compressing means comprises a roller.

3. Flow control means according to claim 1 which includes means for increasing the distance between said compressing means and said backing means when said valve means is open in order to open said flexible tube.

4. Flow control means according to claim 1 in which said flexible tube communicates with said sample chamber indirectly through a connection with said first conduit means at a location between said sample chamber and said valve means.

5. Flow control means according to claim 1 in which said flexible tube communicates with said sample chamber through a direct connection therewith.

6. Flow control means according to claim 1 in which said flexible tube has a second end open to atmosphere.

7. Flow control means comprising
   a sample chamber,
   said sample chamber having an inlet tube and an outlet tube,
   a support member for said sample chamber,
   said support member having a generally cylindrical portion,
   at least one ring member surrounding said generally cylindrical portion and having an inner diameter substantially the same as the outer diameter of said generally cylindrical portion,
   a roller movable along with said ring member about at least a portion of said generally cylindrical portion,
   a flexible tube between said roller and said generally cylindrical portion and extending at least partly around said generally cylindrical portion, said flexible tube generally being compressed between said roller and said generally cylindrical portion to close off said tube,
   means for moving said roller along said flexible tube,
   means for increasing the distance between said roller and said generally cylindrical portion in order to open said tube to permit fluid flow therethrough,
   a vacuum source,
   conduit means between said vacuum source and said outlet of said sample chamber,
   valve means for opening and closing said conduit,
   said flexible tube having a first end connected to and in communication with said conduit at a location between said valve means and said sample chamber and a second end open to atmosphere, and
   means for opening said valve means when said flexible tube is open,
   whereby movement of said roller toward said second end of said flexible tube can cause a vacuum in said sample chamber to draw fluid into said sample chamber, and opening said valve means while said flexible tube is open can cause fluid to flow out of said sample chamber and said flexible tube.

8. A device according to claim 7 in which said means for opening said conduit comprises
   a pivotable lever arm,
   a flexible portion of said conduit in the vicinity of said lever arm,
   spring means generally maintaining one end of said lever arm against said flexible portion of said conduit to maintain said flexible portion closed, and
   means carried by said ring for pivoting said lever arm simultaneously with the opening of said flexible tube to reduce the compression of said flexible portion of said conduit to permit said flexible portion to open.

References Cited
UNITED STATES PATENTS

| 2,960,868 | 11/1960 | Price | 73—425.6 |
| 3,249,059 | 5/1966 | Renn | 103—149 |
| 3,297,558 | 1/1967 | Hillquist | 251—6 X |

ALAN COHAN, Primary Examiner

U.S. Cl. X.R.

73—425.6; 103—149; 251—6